(12) United States Patent  
Doshi (10) Patent No.: US 9,338,007 B1  
(45) Date of Patent: May 10, 2016

(54) SECURE DELEGATED AUTHENTICATION FOR APPLICATIONS

(71) Applicant: Google Inc., Mountain View, CA (US)

(72) Inventor: Munjal Doshi, Sammamish, WA (US)

(73) Assignee: Google Inc., Mountain View, CA (US)

( * ) Notice: Subject to any disclaimer, the term of this patent is extended or adjusted under 35 U.S.C. 154(b) by 174 days.

(21) Appl. No.: 13/662,260

(22) Filed: Oct. 26, 2012

(51) Int. Cl.  
*G06F 21/00* (2013.01)  
*H04L 9/32* (2006.01)  
*G06F 21/62* (2013.01)

(52) U.S. Cl.  
CPC .............. *H04L 9/3202* (2013.01); *G06F 21/62* (2013.01)

(58) Field of Classification Search  
CPC ...... H04L 9/3202; G06F 21/604; G06F 21/62  
USPC ....................... 726/4, 9, 29; 709/225; 455/411  
See application file for complete search history.

(56) References Cited

U.S. PATENT DOCUMENTS

| 8,649,768 | B1 * | 2/2014 | Gaddam et al. | 455/411 |
| 2003/0163548 | A1 * | 8/2003 | Stickler | 709/218 |
| 2006/0015358 | A1 * | 1/2006 | Chua | 705/1 |
| 2011/0131643 | A1 * | 6/2011 | Lawrence et al. | 726/10 |
| 2011/0225637 | A1 * | 9/2011 | Counterman | 726/7 |

* cited by examiner

*Primary Examiner* — Hadi Armouche  
*Assistant Examiner* — Angela Holmes  
(74) *Attorney, Agent, or Firm* — McDermott Will & Emery LLP (57) ABSTRACT

A system for secure delegated authentication for applications may include one or more processors and a memory. The one or more processors perform operations including receiving a request from an application to retrieve a user authorization associated with a service provider. The operations also include authenticating the application in response to the request, the application being assigned a first identifier to associate the request with the application. The operations also include communicating the request to the service provider upon the application being authenticated. The operations also include receiving a response from the service provider, the response identifying a particular application associated with the service provider. The operations also include comparing the first identifier with at least a portion of the response to determine a match. The operations further include forwarding the received response to the application if a match is determined.

22 Claims, 5 Drawing Sheets

FIG. 5

SECURE DELEGATED AUTHENTICATION FOR APPLICATIONS

FIELD

The present description relates generally to authentication systems, and more particularly, but not exclusively, to secure delegated authentication for applications.

BACKGROUND

Third-party applications often require limited access to a user's account on an Internet site or a native application for certain types of activity. To ensure that user data remains protected, all requests for access are approved by the account holder. Authentication protocols allow an end-user to authorize an application to access their protected data, and then the application has access to their data based on the grant. Authentication protocols are typically web-based (i.e., loaded over Internet protocols). This makes it difficult for a grant to be routed securely to applications other than web-based applications. As such, the user experience for non-web-based applications is reduced.

SUMMARY

The disclosed subject matter relates to a computer-implemented method for secure delegated authentication for applications. The method including receiving a request from an application to retrieve a user authorization associated with a service provider. The method further includes authenticating the application using a first identifier to associate the request with the application. The method also includes communicating, after authenticating the application, the received request to the service provider. The method includes receiving a response from the service provider, at least a portion of the response identifying a particular application. The method also includes determining if there is a match between the at least a portion of the response and the first identifier associated with the application that initiated the request. The method further includes forwarding the received response to the application if a match is determined.

The disclosed subject matter further relates to a system for secure delegated authentication for applications. The system includes one or more processors and a memory including instructions that, when executed by the one or more processors, cause the one or more processors to perform operations comprising receiving a request from an application to retrieve a user authorization associated with a service provider. The operations also include authenticating the application in response to the request, the application being assigned a first identifier to associate the request with the application. The operations further include communicating the request to the service provider upon the application being authenticated, and receiving a response from the service provider, the response identifying a particular application associated with the service provider. The operations also include comparing the first identifier with at least a portion of the response to determine a match. In addition, the operations include sending the received response to the application if a match is determined.

The disclosed subject matter further relates to a non-transitory machine readable medium embodying instructions that, when executed by a machine, allow the machine to perform a method for secure delegated authentication for applications. The method includes receiving a request from an application to retrieve a user authorization associated with a service provider. The method also includes authenticating the application using a first identifier that is indicative of the application that initiated the request. The method further includes communicating the request to the service provider to perform operations in response to the request, and receiving a response from the service provider based on the request, the response comprising a second identifier associated with the application. The method also includes matching the second identifier with the first identifier to determine whether the received response is targeted for the application that initiated the request. Further, the method includes forwarding the received response to the application if a match is determined.

It is understood that other configurations of the subject disclosure will become readily apparent to those skilled in the art from the following detailed description, wherein various configurations of the subject disclosure are shown and described by way of illustration. As will be realized, the subject disclosure is capable of other and different configurations and its several details are capable of modification in various other respects, all without departing from the scope of the subject disclosure. Accordingly, the drawings and detailed description are to be regarded as illustrative in nature and not as restrictive.

BRIEF DESCRIPTION OF THE DRAWINGS

Certain features of the subject disclosure are set forth in the appended claims. However, for purpose of explanation, several implementations of the subject disclosure are set forth in the following figures.

DETAILED DESCRIPTION

The detailed description set forth below is intended as a description of various configurations of the subject disclosure and is not intended to represent the only configurations in which the subject disclosure is practiced. The appended drawings are incorporated herein and constitute a part of the detailed description. The detailed description includes specific details for the purpose of providing a thorough understanding of the subject disclosure. However, it will be clear and apparent to those skilled in the art that the subject disclosure is not limited to the specific details set forth herein and is practiced without these specific details. In some instances, well-known structures and components are shown in block diagram form in order to avoid obscuring the concepts of the subject disclosure.

Third-party applications often require limited access to a user's account on an Internet site or a native application for certain types of activity. To ensure that user data remains protected, all requests for access are approved by the account holder. Typical authentication protocols allow an end-user to authorize an application to access their protected data (or protected resources), and then the application has access to their data based on the grant. The authentication protocols are typically loaded over hypertext transport protocol (HTTP) protocols. However, certain applications run inside a special container where they cannot be loaded over HTTP, and hence cannot perform redirects or set cookies. Since web authentication protocols utilize these HTTP features to implement federated identity and authentication, it is desirable to enable such applications to do authentication with identity providers over HTTP.

Moreover, installed applications perform authentication using embedded web views (i.e., embedding a web browser). However, embedded web views provide inferior security. For example, a web view that is opened from an application can allow the embedding application to have full control of the session. This may inadvertently allow the embedding application to have unauthorized access to end-user credentials, which are exposed during the authentication process with a service provider. As such, the embedding application can steal cookies and data of the user from the service provider. Accordingly, it is desirable to prevent unauthorized interception of end-user credentials to improve security of the authentication process. In addition, an application with embedded web views typically provides no single-sign-on experience since the embedded web views are typically isolated from each other.

The subject disclosure is directed to improving the security of client-provided redirect uniform resource locators (URLs). The subject disclosure may also provide a single-sign-on experience to an end-user such that the user would avoid signing on again to a same provider if another application also uses the same provider.

In this regard, the disclosed subject matter provides for secure delegated authentication for applications. A system application handles requests between a third-party application and service providers to obtain user authorization. The system application that received the request can assign a unique identifier that associates the received request with the third-party application. The system application then performs an authentication flow with the service provider. The system application is also able to detect when the authentication flow is complete from the provider side. In some examples, the service provider can also authenticate the user (or third-party application). After performing the authentication, the system application communicates the request by the third-party application to the service provider. The service provider may be configured to perform several operations in response to the request. The system application receives a response from the service provider, in which the response includes an identifier associated with the third-party application. As such, the system application can perform secure routing (or redirect) of the response by comparing the application identifier embedded in the response from the service provider with the identifier associated with the application that initiated the request. The system application is able to keep the context of the requesting application when starting the authentication flow to the service provider so that the system application can use that context later to perform the check. Upon successful check, the system application securely routes the response from the service provider to the third-party application. As such, the service providers can support this secure route technique without having additional (or special) features. More importantly, responses from service providers can be securely routed to non-web applications even though authentication protocols are typically designed for web applications having web-based features.

Authentication and Authorization

Many web applications have counterpart mobile applications, such as native applications. The native applications typically require a user's credentials to authenticate them. Authentication procedures typically use web-based protocols (e.g., OAuth 2.0, OpenID, SAML). To enable a mobile application to use the web-based protocols, the mobile device's user would typically use an embedded web browser on the mobile device. Authentication procedures typically provide for an application to perform a one-time registration with a provider, and as part of the registration specifies a redirect URL. The application then starts an authentication flow to a provider by redirecting a user's application (e.g., web browser) to a provider URL. In this regard, the embedded web view would typically point to a URL of a web page associated with the native application (e.g., login page).

The provider authenticates the user and requests the user to authorize the application to access the requested data. Upon user approval, the provider redirects back to the URL the application specified at registration. In this regard, after the user successfully logs into the web site, the web site typically redirects the user to a page that generates a token, which is then passed to the native application for authentication. The token can be communicated back to the native application as a cookie or window title. After the web site has generated the token and included the token in a response via the cookie or window title, the native application typically extracts the token and closes the embedded web view. Upon receipt of the token, the token can be used by the native application to authenticate calls to the application's server-side APIs.

During application registration, a client identifier, one or more redirect URLs, and a client secret may be specified. A request for authentication would typically include the client identifier and redirect URL, as well as an indication of the type of application (e.g., web server, JavaScript, device, installed application). Upon receipt of the request, an authentication server may select an active session associated with the requesting application if the user was already logged in, accept and validate the user credentials, obtain user consent for the requested permissions, and return a response to the application. The contents of the response may depend upon the type of application. For web applications, the response may be an authorization code, which can be exchanged for an access token and/or refresh token. For client-side applications (or installed applications), the response may be an access token. After obtaining the access token, the application can use the access token to make a web service request to an API endpoint that in return provides profile information about the user. In some examples, access tokens are sent to the API endpoint in the HTTP authorization header, or as a query string parameter if HTTP header operations are not available.

In an aspect, an authorization server supports web server applications (e.g., PHP, Java, Python, Ruby, ASP.NET) and mobile applications (e.g., mobile operating systems). A sequence with the authorization servers begins with redirecting an embedding application (e.g., embedded web browser) to a URL with a set of query parameters that indicate the type of endpoint API access a requesting application requires. The authorization server can be configured to handle the user authentication, session selection and user consent, but the result of the sequence is an authorization code. After receiving the authorization code, the application can exchange the code for an access token and a refresh token.

In another aspect, the authorization server supports JavaScript applications (e.g., JavaScript running in a web browser). In response to a request, the authorization server issues an access token given the type of the application (i.e., JavaScript). The client can validate the received token, and thereafter include the access token in an endpoint API request.

User Accounts

A user account allows a user to authenticate to system services (e.g., web applications) and receive authorization to access them. To log in to a user account, a user may authenticate herself with a password or other credentials for the purposes of accounting, security, and resource management, for example. Once the user has logged on (e.g., to a web browser, to a computing device, etc.) an operating system may use an identifier such as an integer to refer to the user, rather than a username. For example, the username may be correlated with a user identifier. A system may reconcile and validate the proper ownership of user accounts, and can permanently link ownership of those user accounts to particular individuals by assigning a unique identifier to validated account login identifiers (e.g., user names and passwords, secure identifiers, etc.). The system may validate those individuals only having account login identifiers for the appropriate systems and applications, for example according to an organization's business policies, access control policies, and various application requirements.

A unique identifier in the context of identity correlation may be any identifier that is guaranteed to be unique among all identifiers used for a group of individuals and for a specific purpose. Unique identifiers may be serial numbers assigned incrementally, random numbers selected from a number space much larger than the maximum (or expected) number of objects to be identified, names, or codes allocated by choice but verified as unique. Unique identifiers may be used to sync web applications, browser extensions, and responses among various computing devices accessible to a user.

Figure 1:
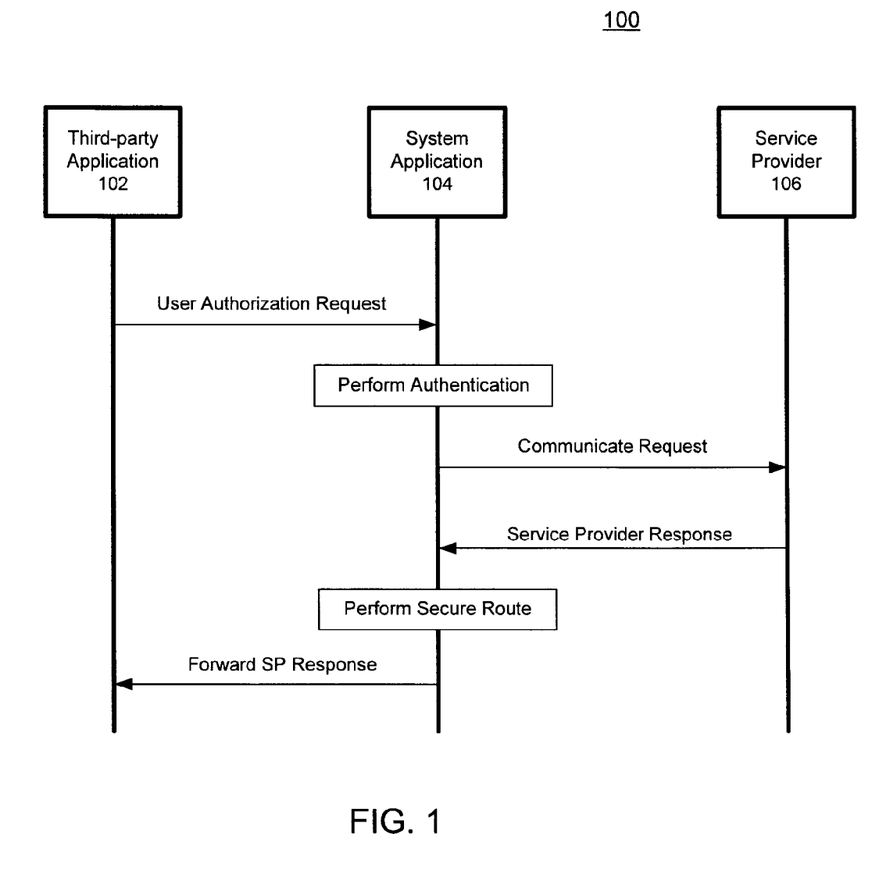
FIG. 1 illustrates an example flow diagram for secure delegated authentication for applications according to one or more implementations.

FIG. 1 illustrates an example flow diagram 100 for secure delegated authentication for applications. In example aspects, a method for secure delegated authentication for applications are facilitated by a third-party application 102, a system application 104, and a service provider 106. In many examples, the system application 104 can be a web-based application, a JavaScript application, an installed application, a web server application, or a device application. In some examples, the installed application is a non-web application without capability of embedding a web-browser or loading over HTTP. The system application 104 receives a request from the third-party application 102 requesting user authorization to access protected data (or resources) from the service provider 106. Upon receiving the request, the system application 104 authenticates the third-party application 102 using a unique identifier, which associates the request with the third-party application 102. In an aspect, the system application 104 assigns the unique identifier to the third-party application 102. For example, the identifier identifies the requesting third-party application during an authentication process such that the system application 104 can properly identify the application that initiated the request. The identifier allows a system (e.g., the system application 104) handling the authentication process to securely route information between the service provider (e.g., service provider 106) and a requesting entity (e.g., the third-party application 102).

The system application 104 performs an authentication flow with the service provider 106 to authenticate the requesting third-party application 102. The system application 104 communicates (or forwards) the request from the third-party application 102 to the service provider 106 upon authenticating the third-party application 102. The system application 104 receives a response from the service provider 106. The response includes an identifier associated with a particular application that enables the system application 104 to securely route the response to the application that initiated the request. For example, the system application 104 can determine whether the response is targeted for the third-party application that initiated the request for user authorization by determining a match between the unique identifier originally assigned to the third-party application 102 and the identifier included within the response from the service provider. In some examples, the response includes a request from the service provider 106 to send a redirect network address (e.g., redirect URL) to the third-party application 102. In other examples, the response includes a token that enables the third-party application 102 to retrieve the authorized data from the service provider 106. The token can be a request token, an access token or a refresh token.

In performing a secure route of the received response, the application 106 compares at least a portion of the received response and the identifier associated with the third-party application 102 to determine whether the received response is targeted for the requesting third-party application 102. In an aspect, the system application 104 assigns the unique identifier to the third-party application 102 using information the system application 104 received within package information from one or more reliable sources. In an example, the unique identifier is based on a hexadecimal or binary value that represents (or identifies) the third-party application 102. The identifier can be a value having a string length of 32 characters (e.g., "aBcDeFgHiJkLmNoPaBcDeFgHiJkLmNoP"). In another aspect, the system application 104 may obtain a public key from the third-party application 102 to compute a hash value and then translate that value into the 32-character string length value. In other aspects, the identifier may be less or greater than 32 characters, or a portion of the character string may identify the third-party application 102. By providing the unique identifier, the system application 104 properly selects the session associated with the third-party application 102. The advantage of the system application 104 performing the secure route is that it avoids any authorized information reaching any unauthorized or unintended recipients (e.g., an embedding application stealing cookies).

In some example aspects, the response includes a redirect network address defined by the requesting third-party application 102 during a registration between the third-party application 102 and the service provider 106. In other example aspects, the system application 104 stores the identifier assigned to the third-party application 102. As such, the system application 104 can determine a match between the at least a portion of the redirect network address and the stored identifier associated with the initiating request. The system application 104 sends the received response to the third-party application 102 when a match is determined. In still other example aspects, the system application 104 determines that the received response is not to be forwarded to the third-party application 102 when a mismatch is detected during the comparison. Accordingly, the system application 104 does not forward the received application in order to provide secure delegated authentication between the requesting third-party application 102 and the service provider 106.

In example aspects, the system application 104 parses the received response to obtain the redirect network address, in which at least a portion of the redirect network address is indicative of the third-party application 102. In some example aspects, the system application 104 receives consent from a user of the third-party application 102. For example, the user consent provides permission for the third-party application 102 to obtain user authorization in order to retrieve authorized data (or protected resources). In one example, the consent is obtained via a user interface during the authentication process. In another example, the system application 104 obtains consent via permission settings provided by the user in a user profile (not shown). In this regard, the system application 104 sends the obtained consent to the service provider 106 to facilitate a single-sign-on experience for a user of the third-party application 102.

Figure 2:
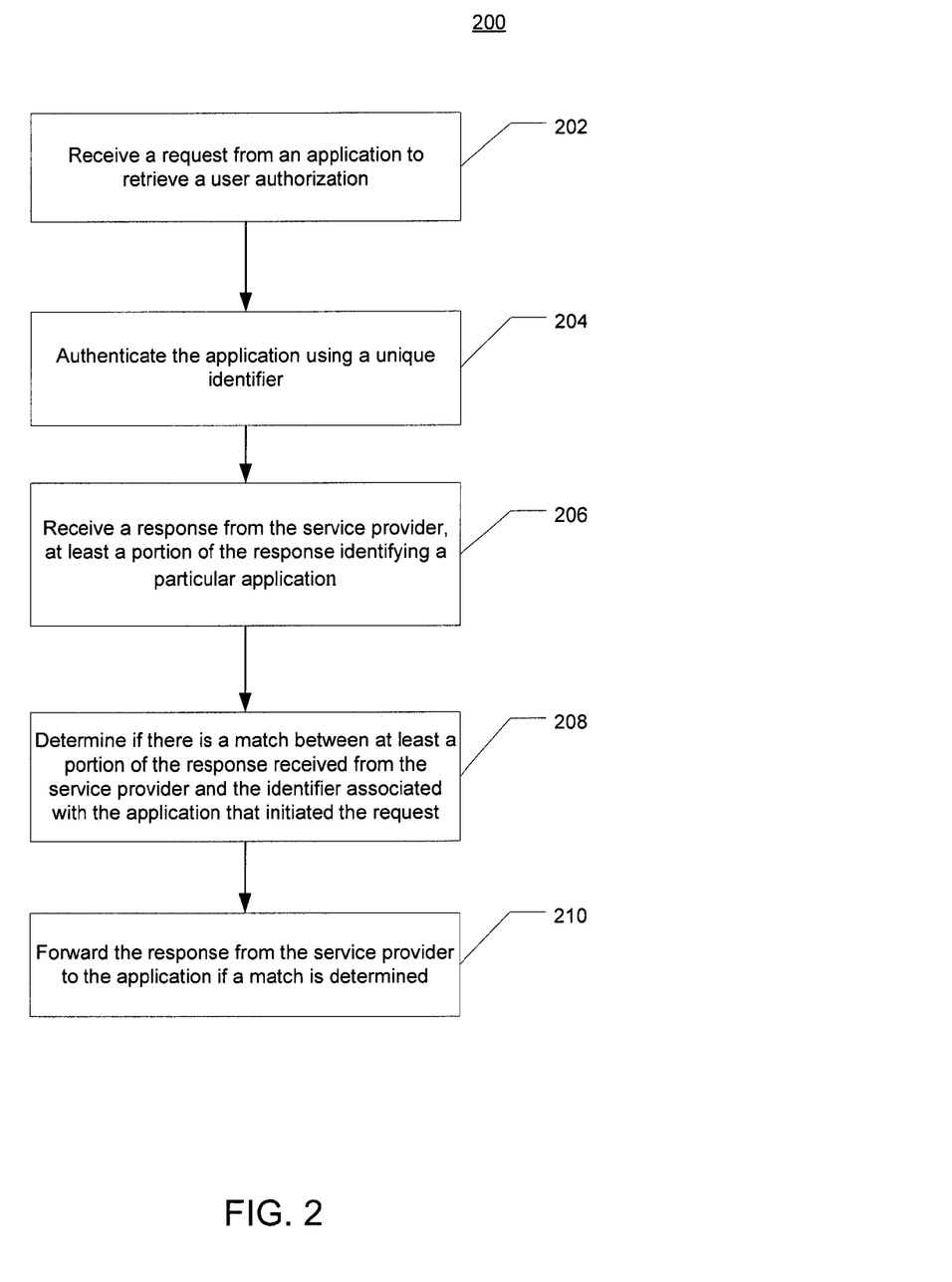
FIG. 2 illustrates a flowchart illustrating an example secure delegated authentication for applications according to one or more implementations.

FIG. 2 illustrates a flowchart that relates to a computer-implemented method 200 for secure delegated authentication for applications. At step 202, a request from a third-party application is received by a system application to retrieve authorized data from a service provider. The system application authenticates the third-party application upon receiving the request. In some examples, the service provider can also authenticate the user. The system application handling the request assigns an identifier to the request in order to associate the request with the third-party application that initiated the request. This enables the system application performing the authentication to properly identify the active session for secure routing of the user authorization.

At step 204, the system application performs an authentication of the requesting third-party application with the service provider. In one example, the authentication process includes providing a user interface to receive user credentials for accessing the service provider. The user credentials can be an indication of consent by the user of the third-party application to receive authorization. In another example, the authentication process includes sending the indication of consent to the service provider so that the service provider can also authenticate the user. Upon authenticating the third-party application, the system application communicates or transmits the request from the third-party application to the service provider.

At step 206, the system application receives a response from the service provider. In this regard, the response includes grant information for the third-party application to retrieve the requested authorized data. The grant information can include an identifier associated with the third-party application so that the system application can secure redirect the response to the intended requestor. In this regard, the service provider would look up (or retrieve from memory) a redirect URL that contains the identifier from a prior registration with the third-party application. In such cases, the third-party application registers in advance with the service provider, and provides the service provider a specified identifier and a redirect URL. In some examples, the identifier is associated with a predefined extension indicative of a network address provided by the requesting third-party application during a registration between the requesting third-party application and the service provider. In other example aspects, the response includes the predefined extension including information indicative of the identifier associated with the requesting third-party application. In some example aspects, the received response includes a request by the service provider to forward the redirect network address to the requesting third-party application. In other example aspects, the response includes a token that authorizes the requesting third-party application to retrieve the authorized data from the service provider without further authentication.

At step 208, a comparison between at least a portion of the response received from the service provider and the identifier associated with the third-party application that initiated the request is performed to determine a match. In order to securely route the response from the service provider, the requesting third-party application must be the intended recipient. By determining a match, the response is securely routed to the requesting third-party application. Alternatively, a mismatch would not allow the response to reach any possible recipients in order to avoid unintended recipients of having unauthorized access to protected data (e.g., user profile information). For example, the system application performing the secure routing determines that the identifier associated with the requesting third-party application does not match the compared portion of the received response.

At step 210, the system application forwards the received response to the requesting third-party application if at least a portion of the response received from the service provider and the identifier associated with the requesting third-party application match. Alternatively, the system application may return an error or send a response to the requesting third-party application that is indicative of the mismatch.

Figure 3:
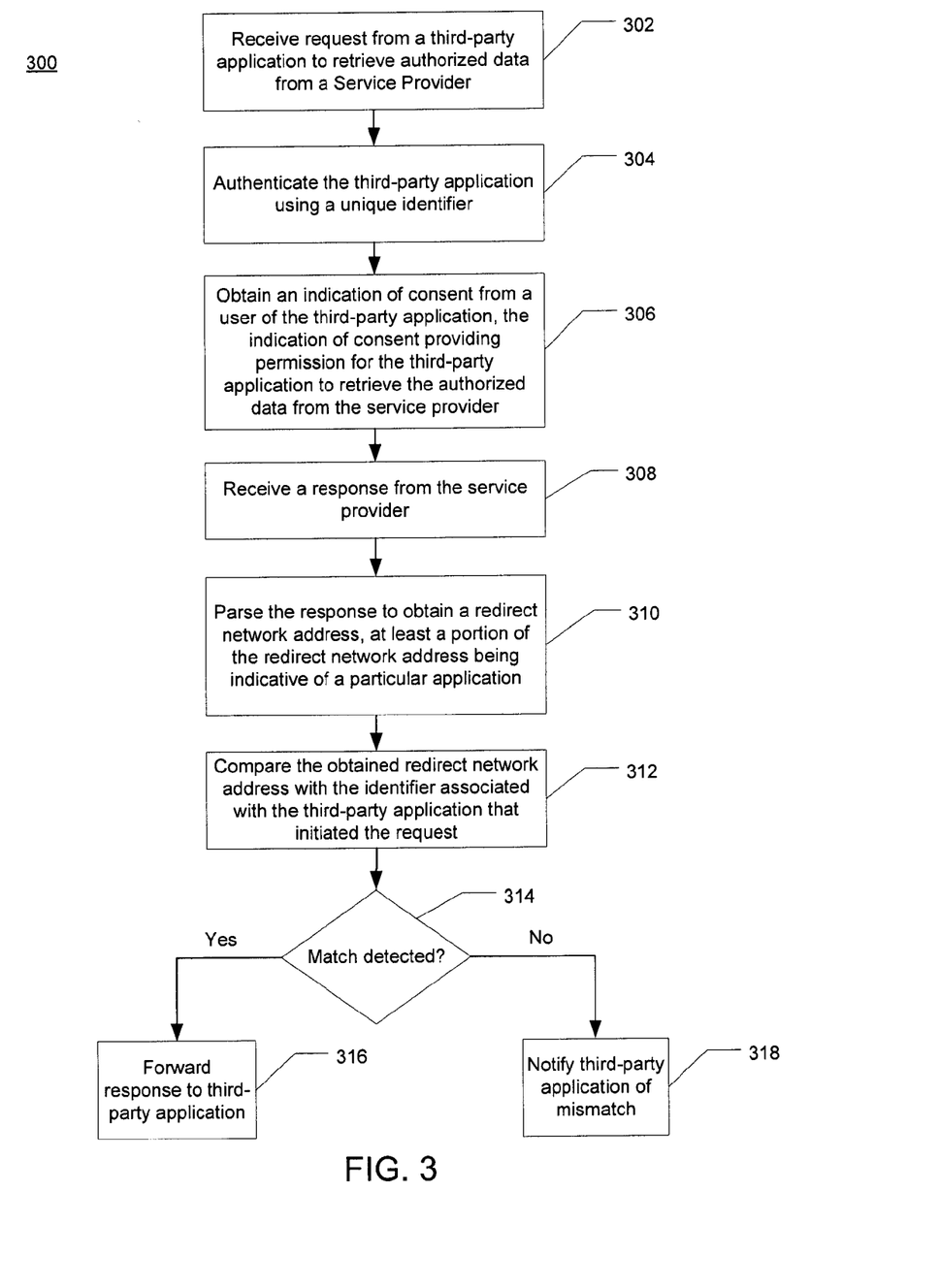
FIG. 3 illustrates a flowchart illustrating another example secure delegated authentication for applications according to one or more implementations.

FIG. 3 illustrates a flowchart that relates to a computer-implemented method 300 for secure delegated authentication for applications. At step 302, a system application receives a request from a requesting third-party application to retrieve a user authorization for accessing protected data from a service provider. To securely route any responses from the service provider back to the requesting third-party application, the system application checks whether any traffic from the service provider is in fact forwarded to the correct recipients. To do so, the system application authenticates the third-party application using a unique identifier before forwarding the request to the service provider to initiate the process for user authorization. The system application handling the request can assign the unique identifier to the third-party application in order to associate the request with the third-party application that initiated the request. This enables the system application to securely identify the proper session associated with the requesting third-party application, and thus, properly route the protected information to the intended recipient. This also avoids the possibility for an intercepting application to provide a spoofed identifier that represents the intercepting application as the application that initiated the request. The identifier can be a hexadecimal or binary value that uniquely identifies the requesting third-party application and/or request. The identifier can have a 32-character string length value. In some examples, the request may include a client secret and/or a redirect network address (e.g., redirect URL) that is associated with a prior registration between the requesting third-party application and the service provider. In other examples, the system application may maintain the identifier confidential to provide for a secured authentication flow.

At step 304, the system application responsible for performing an authentication of the requesting third-party application communicates with the service provider. The system application performs the authentication of the requesting third-party application using web-based authentication protocols, including but not limited to, OAuth 1.0, OAuth 2.0, OpenID, OpenID Connect, and SAML. Upon authenticating the third-party application, the system application forwards the request to the service provider to initiate processing of the user authorization.

At step 306, consent from a user of the requesting third-party application is obtained via a user interface. In this regard, the consent provides permission for the requesting third-party application to receive a user authorization in order to retrieve the authorized data from the service provider. The consent can be an indication that is embodied within a manifest of the requesting third-party application (not shown). The system application obtains the indication to provide a single-sign-on experience to an end-user. In some example aspects, the system application requests the end-user to log on to complete the authentication process.

At step 308, the system application receives a response from the service provider. The response may be transmitted after the system application performs the authentication, or after the request has been forwarded to the service provider. The response includes information that is indicative of the identifier associated with the third-party application. In this regard, the application can identify the session supporting the third-party application's request for access to authorized data. In some example aspects, the identifier is defined within an extension associated with a network address that the system application, performing the authentication, identifies and parses. In other example aspects, the response includes a request by the service provider for the system application to forward the response to the intended recipient.

At step 310, the system application performing the secure routing parses the received response in order to obtain a redirect network address. In some implementations, a portion of the redirect network address are indicative of the identifier associated with the third-party application. For example, the identifier can be a 32-character string length using binary or hexadecimal values that are unique in identifying the third-party application. The system application determines whether the received response is intended for the requesting third-party application. Accordingly, the system application selects the session associated with the requesting third-party application. This selection by the system application avoids any responses carrying authorized information to be forwarded to unintended recipients.

At step 312, the secure routing between the service provider and the requesting third-party application can be performed by comparing at least a portion of the response with the identifier associated with the third-party application to determine whether the received response is targeted for the third-party application. The system application performing the secure routing can identify the session initiated by the third-party application using the matching identifier. In some aspects, the system application handling the secure routing determines that the authentication flow is complete when a match is determined.

At step 314, a determination is made as to whether the comparison yielded a match between the identifier and the compared portion of the response. The system application performing the secure route determines whether to forward the received response, in its entirety, to the requesting third-party application based on the comparison results. In some example aspects, the system application forwards at least a portion of the response to the requesting third-party application when a match is detected. For example, the system application sends the received response to the requesting third-party application when the identifier associated with the third-party application matches at least a portion of the response that is received from the service provider (Step 316). In this regard, the response is determined to be intended for the third-party application since the identifier provided by the service provider matched the identifier associated with the initial request. In other example aspects, the system application determines that the received response should not to be forwarded to the third-party application when a mismatch is detected. In such cases, the system application notifies the requesting third-party application of the error or mismatch associated with the attempted secure route (Step 318).

Figure 4:
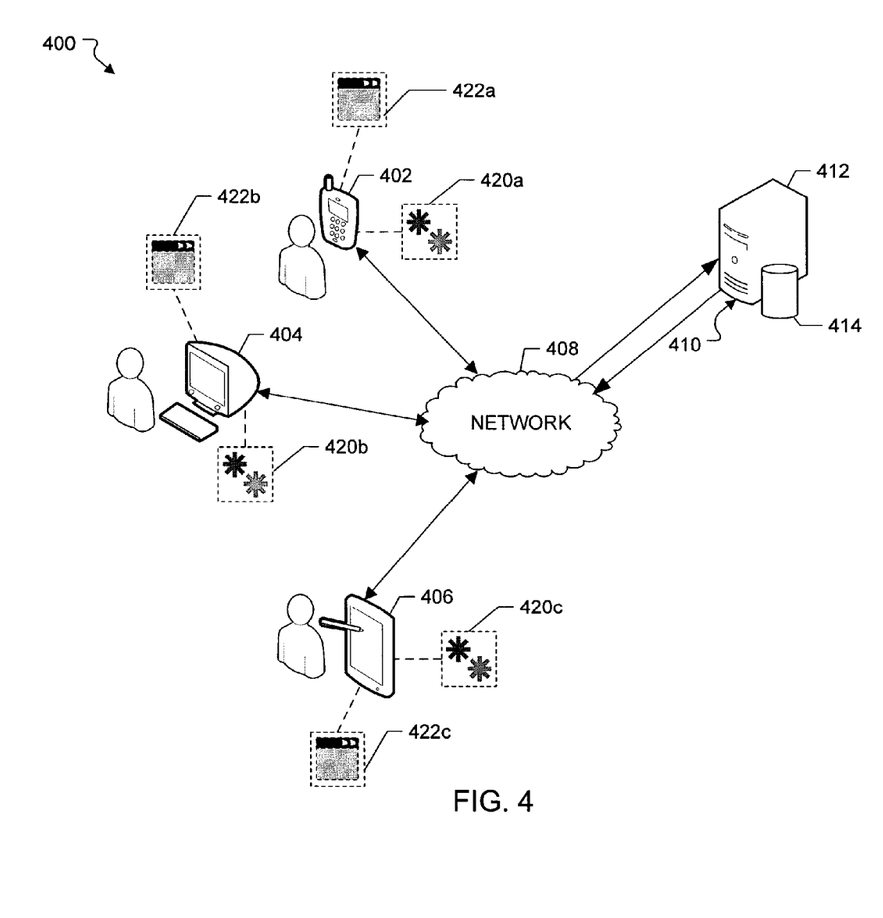
FIG. 4 illustrates a client-server network environment which provides for secure delegated authentication according to one or more implementations.

FIG. 4 illustrates a client-server network environment which provides for secure delegated authentication for applications. That is, the subject disclosure provides a mechanism for routing a user authorization to a third-party application securely while providing a mechanism that grants access to authorized data without the need to share user credentials (e.g., username, password). In many aspects, a user may opt-in to grant access to authorized data. In many examples, authentication protocols (e.g., OAuth 2.0, OpenID, SAML) that support common scenarios involving a web server, JavaScript, device, installed application, and server-to-server are supported by the subject disclosure.

A network environment 400 includes a number of electronic devices 402-406 communicably connected to a server 410 by a network 408. Server 410 includes a processing device 412 and a data storage module 414. Processing device 412 executes computer instructions stored in data storage module 414, for example, to facilitate authentication of electronic devices 402-406. System applications 420a-c can be configured to handle requests initiated by third-party applications 422a-c running on electronic devices 402-406 respectively. In many aspects, the system applications 420a-c are installed to run on the electronic devices 402-406 respectively.

Users interacting with electronic devices 402-406 can initiate authentication for receiving a user authorization in order to access authorized data (e.g., via server 410), by requesting access to messages such as text communications (e.g., comments, replies, announcements, status updates), digital photos, videos, or other appropriate electronic information. Information is retrieved on a user's behalf by systems and/or services external to server 410. For example, a non-web application 422a running on electronic device 402 may request a review of a movie to a movie review website, and with proper permissions, that website may provide the review to the application 422a on the user's behalf. In another example, a web application 420b operating on a mobile device (e.g., electronic device 404), with proper permissions, may request global positioning system (GPS) capabilities to determine the user's location and automatically update a social network with the user's location (e.g., "At Home", "At Work", "In Los Angeles, Calif.").

In an aspect, the applications 422a-c respectively running on electronic devices 402-406 initiate a request to receive a user authorization in order to retrieve authorized data from server 410. The system applications 420a-c respectively handling the request authenticates the requesting third-party application (e.g., applications 422a-c), and can assign a unique identifier to the requesting application in order to associate the request with the third-party application that initiated the request. This enables the system applications 420a-c performing the authentication to properly identify the active session associated with the third-party application that initiated the request for securely routing the user authorization to the third-party applications 422a-c.

Before the requesting application (e.g., applications 422a-c respectively running on electronic devices 402-406) can access a provider API operating on server 410, the third-party application may need to obtain a token (e.g., access token) before making a call to the provider API. In an example, a single token may grant varying degrees of access to multiple APIs. The set of resources permitted by the token can be controlled during the request via parameters of that request. For example, several scopes of permissions are included in the request. In some implementations, the request is employed in one or more ways. For example, a web application using JavaScript may request an access token using JavaScript calls, while an application installed on the electronic device that has no embedded web browser may employ web service requests. In some aspects, the server 410 (i.e., service provider) provides an access token or authorization code based on the type of application making the request (e.g., JavaScript, installed, device, web-based).

The request for user authorization by one or more applications 422a-c respectively running on electronic devices 402-406 may require the user to login. After logging in, the user is presented with the permissions requested by the third-party application, and the user is requested to grant the third-party application those permissions (i.e., user consent). If the user grants permission to the third-party application, the third-party application is sent a token (e.g., access token, refresh token, authorization code). If the user does not grant authorization, the API via the system application (e.g., applications 420a-c) may return an error or a response indicative of the error. In other examples, the user may already be logged in, and the request may include the user consent. Accordingly, the token is delivered to the third-party application (e.g., applications 422a-c) upon authenticating and authorizing the third-party application. The token can be delivered within the redirect URL contained in the response from the service provider (e.g., server 410).

An API can be built into an application, such as a web browser, operating on electronic devices 402-406. In this regard, the API is accessible using one or more scripting languages. Accordingly, a non-web application 422a operating on electronic device 402 can call the API that provides authentication functionality. The call can include a predefined identifier associated with the web application 422a obtained during a registration process between the web application 422a and a service provider operating on server 410. In an example, the predefined identifier can be a 32-character string length using hexadecimal values or binary values that uniquely identifies the application that initiated the request for user authorization. The call can cause an authentication portal with the service provider to be performed by the system application handling the request, for example. Once a user of the web application has been authenticated with the service provider, the web application 422a can be redirected to an authentication endpoint using a redirect network address. In an example, the web application 422a can receive a token via the response from the service provider to obtain access to the authorized data at the service provider.

In order to securely route the token to the applications 422a-c, the redirect network address may include an extension identifier that identifies the respective application. In some examples, there are multiple patterns that can be used as valid redirect network addresses, such as redirect uniform resource locators (URLs). For example, the redirect URL can have a pattern that is associated with the system application performing the secure route, such that the system applications 420a-c can identify the pattern. The pattern can be defined as: "browser-extension://<extension-id>/*." In another example, the redirect URL can have a pattern that can be loaded over secured HTTP, such as "https://<extension-id>.domain name/." In this regard, service providers can validate the format of the redirect URLs by accepting browser-extension special URLs.

For applications 422a-c respectively running on electronic devices 402-406 that request to authenticate with a specific service provider, the applications 422a-c are requested to provide user credentials associated with the specific service provider. The user of the respective third-party application has the option to opt-in to allow the sharing of user credentials. In an example, the third-party application can be requested to provide a client identification number and a scope parameter in a manifest associated with the third-party application. An installation prompt, during a prior registration of the third-party application, can provide authentication-specific permissions as well as application-specific permissions, which can be derived from the scope parameter within the manifest. In other implementations, the authentication-specific permissions and/or application-specific permissions apply to non-web applications, device applications, JavaScript applications, and other mobile applications. When a user of the third-party application approves the permissions, the third-party application can be granted access by the service provider. In some examples, the third-party application can obtain access to the authorized data using a token (e.g., access token, refresh token, authorization code) based on the following exemplary call to the API: "application_name.identity.getAuthToken." Additionally, the permissions can be transparent to the user of the third-party application if access was revoked by the service provider.

For applications 422a-c respectively running on electronic devices 402-406 that request to perform authentication with different service providers, the requesting third-party application can call the API of a system application (e.g., applications 420a-c) associated with the service provider to perform an authentication with that service provider. In an example, the requesting third-party application executes the following exemplary call to initiate the authentication: "application_name.identity.launchAuthFlow." In another example, the API uses a browser pop-up window to display a website associated with the service provider that is configured to receive user credentials via a user interface. In other examples, the API receives a redirect network address having a defined pattern that is detectable by the API. Upon detecting a matching identifier associated with the requesting third-party application, the API is configured to securely forward the redirect network address to the requesting third-party application so that the requesting third-party application can extract a token from the redirect network address.

In some example aspects, a service provider can be associated with a system application that authenticates third party applications in order to handle authentication requests having specific URL patterns such that the system application can intercept and securely route user authorizations to intended third-party applications. If a system application (e.g., applications 420a-c) associated with the service provider is installed on a client device (e.g., electronic devices 402-406), then authentication requests to that provider are handled by the system application. Hence, the system application associated with the service provider can be configured to control the entire user experience.

Electronic devices 402-406 can be computing devices such as laptop or desktop computers, smartphones, PDAs, portable media players, tablet computers, or other appropriate computing devices that can be used to for secure delegated authentication for applications. In the example of FIG. 4, electronic device 402 is depicted as a smartphone, electronic device 404 is depicted as a desktop computer, and electronic device 406 is depicted as a PDA.

In some example aspects, server 410 can be a single computing device such as a computer server. In other implementations, server 410 can represent more than one computing device working together to perform the actions of a server computer (e.g., cloud computing). Examples of computing devices that are used to implement server 410 include, but are not limited to, a web server, an application server, a proxy server, a network server, or a group of computing devices in a server farm. Furthermore, network 408 can be a public communication network (e.g., the Internet, cellular data network, dialup modems over a telephone network) or a private communications network (e.g., private LAN, leased lines).

Figure 5:
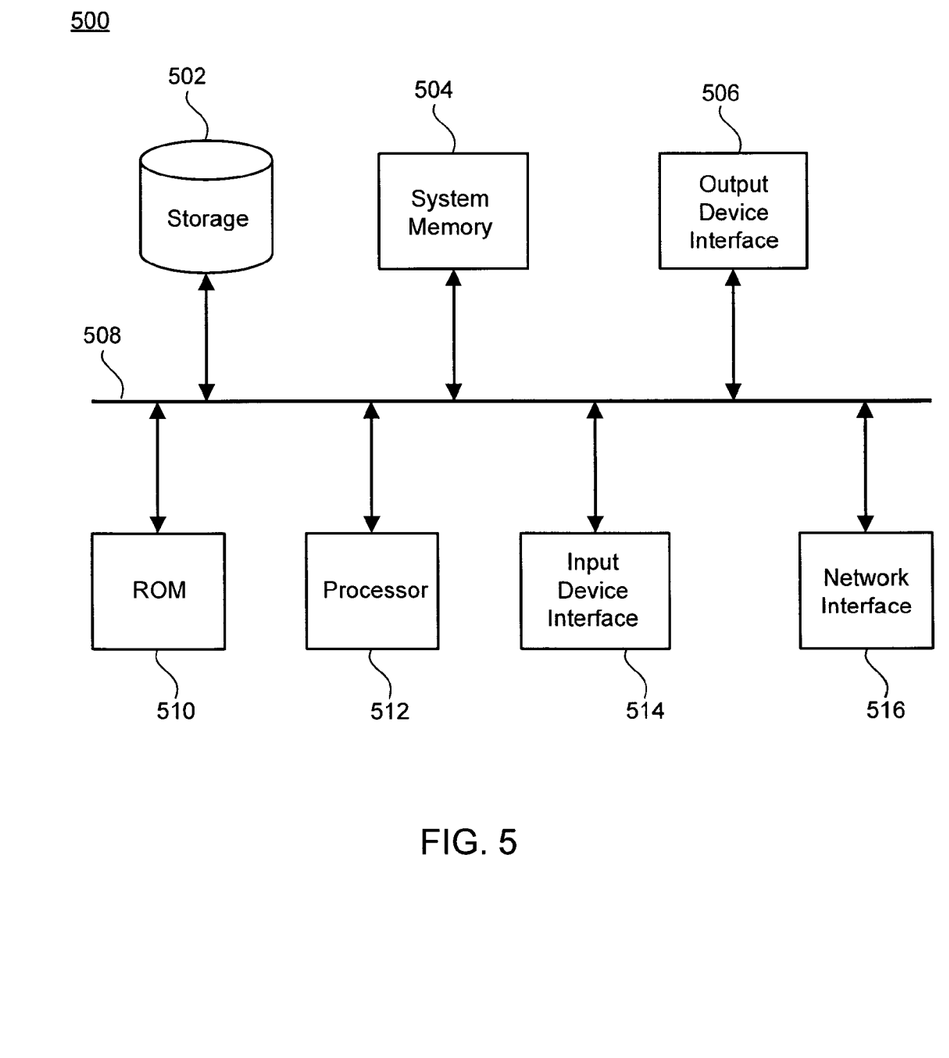
FIG. 5 conceptually illustrates an electronic system with which some implementations of the subject disclosure is implemented.

FIG. 5 conceptually illustrates an electronic system with which some implementations of the subject disclosure is implemented. Electronic system 500 can be a server, computer, phone, PDA, a tablet computer, a television with one or more processors embedded therein or coupled thereto, or generally any electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is powered off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units may include instructions for processing, generating, and/or providing verification requests and/or verification responses in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques are implemented using one or more computer program products. Programmable processors and computers are included in or packaged as mobile devices. The processes and logic flows are performed by one or more programmable processors and by one or more programmable logic circuitry. General and special purpose computing devices and storage devices are interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as are produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, such as a CRT or LCD monitor, for displaying information to the user and a keyboard and a pointing device, such as a mouse or a trackball, by which the user can provide input to the computer. Other kinds of devices are used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in the subject disclosure can be implemented in a computing system that includes a back end component, such as a data server, or that includes a middleware component, such as an application server, or that includes a front end component, such as a client computer having a graphical user interface or a Web browser through which a user can interact with an implementation of the subject matter described in this specification, or any combination of one or more such back end, middleware, or front end components. The components of the system can be interconnected by any form or medium of digital data communication, such as a communication network. Examples of communication networks include a LAN and a WAN, an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of example approaches. Based upon design preferences, it is understood that the specific order or hierarchy of blocks in the processes are rearranged, or that all illustrated blocks be performed. Some of the blocks are performed simultaneously. For example, in certain circumstances, multitasking and parallel processing is advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein is applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Headings and subheadings, if any, are used for convenience only and do not limit the subject disclosure.

The term website, as used herein, may include any aspect of a website, including one or more web pages, one or more servers used to host or store web related content, and the like. Accordingly, the term website is used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject disclosure or that such aspect applies to all configurations of the subject disclosure. A disclosure relating to an aspect may apply to all configurations, or one or more configurations. A phrase such as an aspect may refer to one or more aspects and vice versa. A phrase such as a "configuration" does not imply that such configuration is essential to the subject disclosure or that such configuration applies to all configurations of the subject disclosure. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for secure delegated authentication for applications, the method comprising:
receiving a request from an application to retrieve a user authorization associated with a service provider;
authenticating the application using a first identifier to associate the request with the application, the first identifier identifying an active session associated with the application that provided the request;
communicating, after authenticating the application, the received request to the service provider;
receiving a response from the service provider, at least a portion of the response comprising a redirect network address identifying a second identifier associated with a particular application;
parsing the received response to obtain at least a portion of the redirect network address that corresponds to the second identifier;
determining if there is a match between the at least a portion of the redirect network address and the first identifier associated with the application that provided the request; and
forwarding the received response to the application if a match is determined.

2. The method of claim 1, wherein the second identifier is associated with a predefined extension indicative of a network address provided by the application during a registration between the application and the service provider.

3. The method of claim 2, wherein the response comprises the predefined extension including information indicative of the second identifier associated with the application.

4. The method of claim 1, wherein the received response comprises a request from the service provider to forward the redirect network address to the application.

5. The method of claim 1, further comprising: obtaining an indication of user consent for the application, the user consent providing permission for the application to retrieve authorized data from the service provider.

6. The method of claim 5, wherein communicating the request comprises sending the obtained indication of user consent to the service provider.

7. The method of claim 1, wherein authenticating the application comprises providing a user interface to receive user credentials for accessing the service provider.

8. The method of claim 1, wherein the response comprises a token that authorizes the application to retrieve authorized data from the service provider.

9. The method of claim 1, further comprising:
determining that the received response is not to be forwarded to the application when a comparison between the first identifier and the at least a portion of the redirect network address that corresponds to the second identifier produces a mismatch.

10. The method of claim 9, further comprising:
notifying the application that the received response from the service provider is not to be forwarded to the application based on the mismatch.

11. A system for secure delegated authentication for applications, the system comprising:
one or more processors; and
a memory including instructions that, when executed by the one or more processors, cause the one or more processors to perform operations comprising:
receiving a request from an application to retrieve a user authorization associated with a service provider;
authenticating the application in response to the request, the application being assigned a first identifier to associate the request with the application, the first identifier identifying an active session associated with the application that provided the request;
communicating the request to the service provider upon the application being authenticated;
receiving a response from the service provider, the response comprising a redirect network address identifying a second identifier associated with a particular application;
parsing the received response to obtain at least a portion of the redirect network address that corresponds to the second identifier;
comparing the first identifier to the at least a portion of the redirect network address to determine a match; and
sending the received response from the service provider to the application if a match is determined.

12. The system of claim 11, wherein the memory further includes instructions that facilitate the steps of:
storing the first identifier in the memory; and
retrieving the stored first identifier from the memory to compare to the second identifier.

13. The system of claim 11, wherein the second identifier is associated with a predefined extension indicative of a network address provided by the application during a registration between the application and the service provider.

14. The system of claim 13, wherein the response comprises the predefined extension including information indicative of the second identifier associated with the application.

15. The system of claim 11, wherein the received response comprises a request from the service provider to forward the redirect network address to the application.

16. The system of claim 11, wherein the response comprises a token that authorizes the application to retrieve authorized data from the service provider.

17. A non-transitory machine readable medium embodying instructions that, when executed by a machine, allow the machine to perform a method for secure delegated authentication for applications, the method comprising:
receiving a request from an application to retrieve a user authorization associated with a service provider;
authenticating the application using a first identifier that is indicative of the application that provided the request, the first identifier identifying an active session associated with the application that provided the request;
communicating the request to the service provider to perform operations in response to the request;
receiving a response from the service provider based on the request, the response comprising a redirect network address identifying a second identifier associated with the application;
parsing the received response to obtain at least a portion of the redirect network address that corresponds to the second identifier;
comparing the at least a portion of the redirect network address to the first identifier to determine whether the received response is targeted for the application that provided the request; and
forwarding the received response to the application if a match is determined.

18. The non-transitory machine readable medium of claim 17, wherein the second identifier is associated with a predefined extension indicative of a network address provided by the application during a registration between the application and the service provider.

19. The non-transitory machine readable medium of claim 18, wherein the response comprises the predefined extension including information indicative of the second identifier associated with the application.

20. The non-transitory machine readable medium of claim 17, wherein the received response comprises a request from the service provider to forward the redirect network address to the application.

21. The non-transitory machine readable medium of claim 17, wherein the response comprises a token that authorizes the application to retrieve authorized data from the service provider.

22. The method of claim 1, wherein the first identifier uniquely identifies the active session associated with the application from among a plurality of sessions associated with other applications.

* * * * *